United States Patent Office 3,255,283
Patented June 7, 1966

3,255,283
METHOD FOR ELECTRODE FABRICATION
Richard Weidman, Verona, N.J., assignor, by mesne assignments, to Sheer-Korman Associates, Inc., New York, N.Y., a corporation of Delaware
No Drawing. Continuation of application Ser. No. 102,355, Apr. 12, 1961. This application June 2, 1965, Ser. No. 460,836
7 Claims. (Cl. 264—29)

This is a continuation of application Serial No. 102,355 filed on April 12, 1961, for Method for Electrode Fabrication.

This is a process for production of carbon or carbon-containing bodies, such as electrodes, consisting wholly or in part of carbon. The shape may be any one desired, such as rectangular, cylindrical, spherical, etc. The non-carbon components may be any other solid material. The uses to which such bodies may be put include metallurgical furnaces using 100% carbon electrodes (e.g. conventional arc furnaces such as are used for making electrical smelted steel, high quality steels, aluminum, etc.). Other uses, which each and severally help to dictate the specific composition of the electrode or carbonaceous body, include brush stock for electrical sliding contacts in motors, etc., electronic resistor elements, high temperature furnace heater elements, and other conventional carbon specialities; also, filler cores for lead pencils.

An important application of the invention comprises the production of electrodes for use as anodes in the hierarc process.

It is an object of this invention to provide a process for the production of carbon or cabon-containing bodies which have great improvements over articles produced by existing processes and which can be manufactured faster and more easily, and which may have a far greater range of carbon content. Articles made by this process moreover may be baked in a much shorter period of time and are harder and more durable, and yet have greater conductivity. This faster baking rate is obtained moreover whether the process be applied to the production of all carbon bodies or to bodies having as low as 2% carbon, and the rest of the body may comprise any other metals or materials such as metal, metal oxides, carbides, ores, elements, compounds or mixtures.

The carbon contents may come from only the binder for very low carbon content bodies. For higher carbon content bodies the carbon is supplied from both the binder and a carbon filler. This carbon filler may be cokes, carbon blacks, graphites, coals, etc. These fillers contribute very little or nothing to the bonding of the electrode. The liquid binder of this invention is the sole binder and produces a truly carbon bonded body. The carbon fillers need have no volatile content nor any restriction on oxygen and nitrogen content. The carbon filler may have a volatile content up to 1.5% but in most cases it will be an inert coke of 0.5% or less volatile content.

The carbon content of the electrode including carbon filler and carbon contributed from the binder is dictated by the stoichiometry of the reaction for which the electrode is used. As an example, carbon content of a carbon-uranium dioxide electrode would be dictated by whether the carbothermic reduction products shall be uranium dicarbide, uranium monocarbide or uranium metal. In other cases, such as for vaporization of metals or metal oxides in air, carbon stoichiometry is not essential and the carbon in the electrode serves only the purposes of making the electrode electrically conductive and bonding it together. Here a wide choice of carbon contents is possible and would be dictated by economies of power and production rates which are a function of percent carbon in the electrode.

The present standard practice, as heretofore known, for making electrodes for such purposes comprises taking a coke flour, with or without an inert filler such as ground ore, and mixing it under heat and pressure with an organic binder such as tar, asphalt, molasses, pitch or other organic carbon material. Such materials have been mixed when hot in order to convert the binder to fluid form capable of wetting all the other solid particles. The heat aided liquefaction of the binder and also reduced its viscosity so that maximum wetting and solid particles coating could be achieved.

In this standard practice the resultant hot mass was then molded or extruded and allowed to solidify by cooling into a "green," that is, an unbaked form. Following thereafter, in the next step in this standard practice, the green rods so fabricated are packed into suitable sand or coke beds and heated very slowly (2° C. to 10° C. per hour), depending on the size of the charge. The baking, according to such procedures, took several days to as much as three weeks or more.

In accordance with this present invention it has been found that the prolonged baking has been due to the effect of the heat during the baking on the binders which have been employed. When the article so made is heated the binding material in the outer layers becomes fused into a viscous mass, which obstructs the exit of any gases generated in the interior layers, until this outer mass itself has been carbonized. If fast baking is attempted, the viscous mass on the outer layers starts to solidify, the pressure of the gas generated in the interior passing through the outer layers of the binder as they harden, which may produce spalling or otherwise interfere with the continuity of the carbon body as it is being formed. To avoid these difficulties a very prolonged baking period has been necessary, and, moreover, when the binding material is relatively viscous such as the resins and tars heretofore used, the binding material does not always coat all the particles, and a very slow baking is required to obtain a uniform product.

When however the binder comprises a more fluid binder such for example as herein recited, the binder can wet substantially every particle of the source material and permit the waste gases to pass out without cracking or spalling.

In accordance with this invention the binder is sufficiently fluid as the baking begins to wet every particle in the anode composition while leaving sufficient porosity during the baking to permit gases generated in the baking process to escape without cracking or spalling.

Electrodes extruded with the binder of this invention will contain only from 6 to 13% pitch, depending on the bulk densities of the materials in the formulation. Carbon electrodes extruded with this binder need contain only approximately 10% pitch. Thus the pitch values are much lower than the 25% pitch value for hot pitch extruded electrodes. The low pitch content of the electrodes and the easily removed solvent content of the binder on baking permit rapid baking. These electrodes having no excess pitch above that required for good carbon bonding have been baked at rates of 200° C./hr. to 1000° C./hr. Cold electrodes have been placed in furnaces preheated to 1000° C. resulting in excellent quality electrodes.

The range of pitch and solvent contents are kept narrow to facilitate the extrusion and baking process. Too much solvent results in a fluid low viscosity liquid unsuitable for extrusion. Too high of pitch contents approach excessive pitch requiring lower baking rates.

The binder I have used has the following specifications:

| | |
|---|---|
| Specific gravity | 1.10 |
| Percent solids (by weight) | 57 |
| Percent solvent (by weight) | 43 |
| Coal tar pitch, M.P. ° F. | 145 |
| Solvent type (aromatic) | Crude high flash |
| Viscosity, Engler specific | 10 |

The binder may vary in composition and still be useful within the following limits:

| | |
|---|---|
| Specific gravity | 1.05–1.14 |
| Percent solids (by weight) | 51–58 |
| Percent solvent (by weight) | 42–49 |
| Coal tar pitch, M.P., ° F. | 120–160 |
| Solvent type-coal tar solvents compatible with coal tar pitches | |
| Viscosity, Engler specific | 7–12 |

The narrow limiting ranges of the binder specifications are so because a low-solids, low-viscosity binder will not mix or extrude without difficulties, and a high-solids, high viscosity binder will also give mixing difficulties, and more important will give baking problems due to swelling, distortion, cracking, etc.

The binder is prepared by melting the pitch and adding it to the solvent with vigorous agitation to produce a viscous smooth homogeneous liquid.

It will be clear that because the binder is fluid due to the presence of the solvent, the electrode may be extruded cold. Moreover, electrodes may be formed with a very low carbon content.

The amount of liquid binder added is such that strong firm electrodes are extruded. Too much liquid causes the mass to extrude as a soft, mushy electrode. Too little liquid would produce a brittle, cracked electrode or may not extrude at all. Extrusion pressure is varied by varying the amount of liquid added between the two extremes mentioned above. For each material and composition there is a narrow range of liquid content which produces a satisfactory extruded electrode.

On baking the solvent content of the binder distills out leaving an electrode of pitch coated particles. On further heating the pitch decomposes off volatiles leaving a continuous carbon matrix completely coating and bonding all the particles forming a carbon bonded electrode of desirable physical and electrical properties.

The invention shall include a very broad range of electrode composition as follows:

| | Percent |
|---|---|
| Dry basis prior to wet mixing carbon such as coke | 0–100 |
| Other material such as metal oxide | 0–100 |
| Wet basis prior to baking binder (by weight) | 10–30 |
| Baked electrode, percent carbon | 2–100 |

Dry ingredients are blended in a suitable mixer such as a mix miller. The proper amount of liquid binder is then added and mixing continued until the mass is homogenous. The wet mix is loaded into the cylinder of an extrusion press, air is evacuated and the mix is extruded through a die into the desired shape and length. The extruded electrodes are slid into carbon, ceramic or stainless steel tubes slightly larger in diameter than the electrodes.

The tubes containing extruded electrodes are placed in a stainless steel tray and covered with coke flour to prevent oxidation. The ceramic or stainless steel tubes can be fitted with end plugs containing small gas vent holes and placed directly in the furnace with no coke cover. The furnace may be at room temperature and then raised to 900–1000° C. as rapidly as possible or the trays containing tube and electrodes may be placed directly into the furnace preheated to 900–1000° C. Depending on the size of the charge, soaking times may vary from 15 minutes to several hours. The charge may be removed hot or may be cooled before removal from the furnace.

A composition which I have used to make carbon or graphite electrodes by cold mixing and cold extrusion and rapid baking is as follows:

| | Parts by weight |
|---|---|
| Coke flour | 100 |
| Binder | 35 |

Electrodes extruded with the formulation can be baked rapidly as described above or can be baked by passing electric current through them to form carbon electrodes at 900–1000° C. Further heating to about 2800° C. graphitizes the carbon and forms graphite electrodes. Total baking time was less than ½ hour.

I have found that the physical and electrical properties of carbon electrodes made by this cold mixing, cold extrusion and rapid bake procedure are similar to commercial carbon electrodes. The following table illustrates:

| Property | Typical Commercial Carbon Electrode | My Carbon Electrode |
|---|---|---|
| Apparent density, gm./cc | 1.53–1.64 | 1.53 |
| Porosity, percent | 24 | 26 |
| Compressive Strength, p.s.i | 4,000 | 9,000 |
| Electrical resistivity, ohm-cm | .0036–.0046 | .004 |

Examples of type of carbothermic reactions which have been performed by electrodes of this invention are:

(1) $UO_2 + 3C \rightarrow UC + 2CO$
(2) $UO_2 + 2C \rightarrow U + 2CO$
(3) $Cb_2O_5 + 5C \rightarrow 2Cb + 5CO$
(4) $2UO_2 + Cb_2O_5 + 13C \rightarrow 2(UC \cdot CbC) + 9CO$
(5) $2UO_2 + Cb_2O_5 + 9C \rightarrow 2(Cb \cdot U) + 9CO$
(6) $2ZrO_2 + UO_2 + 9C \rightarrow 2ZrC \cdot UC + 6CO$
(7) $UO_2 + ThO_2 + 8C \rightarrow UC_2ThC_2 + 4CO$
(8) $ZrO_2 + 2B + 2C \rightarrow ZrB_2 + 2CO$
(9) $U_3O_8 + 11C \rightarrow 3UC + 8CO$
(10) $U_3O_8 + 2C \rightarrow 3UO_2 + 2CO$ All of the above products have been made by electrodes of this invention by special drip melting techniques to produce perfect spheres of sizes ranging from +60 mesh U.S. Standard to submicron.

This invention shall include electrode composition for making metals, carbides, borides, polycarbides, alloys, oxides, polyoxides, etc. of wide ranges of compositions.

As an example, a composition which I have used for making consumable electrodes for production of uranium carbide is:

| | Gm. |
|---|---|
| Uranium dioxide, natural, −100 mesh U.S.S. | 2000 |
| Coke (99.5C) −325 mesh U.S.S. | 186 |
| Binder | 281 |

The baked electrodes are straight and smooth, very hard and dense. Electrical resistivities were 0.025 ohm-cm. and densities were 5.4 gm./cc. Compressive strength values were 6960 p.s.i. Carbon contents have been reproduced to ±.05% in several batches of electrodes.

As an example of electrodes containing a low carbon value I have made glass electrodes containing 7.4% carbon by the following composition:

| | Gm. |
|---|---|
| Calcium aluminum silicate glass, —60 mesh U.S.S. | 1500 |
| Graphite, —325 mesh U.S.S. | 47 |
| Binder | 275 |

I have also made electrodes of metal powders containing only 2% carbon.

Baking rate will affect the amount of carbon residue from carbonization of the binder. The amount of liquid binder consistent with extrudability, and the amount of carbon filler must be balanced for a specific baking rate to yield a baked electrode of specific carbon content where carbon content is critical.

I claim:
1. A process for forming an electrically conductive carbon-containing body for use as an electrode which comprises the steps of
  preparing a quantity of binder having a 51–58% pitch content by weight and a 42–49% solvent content by weight which renders said pitch fluid at room temperature, said pitch containing in part undistilled volatiles and carbon,
  cold mixing 100 parts by weight of powdered metal oxide with 12 to 42 parts by weight of said fluid binder at room temperature until the metal oxide-binder mass is homogeneous and in an extrudable state where the grains of said metal oxide are coated with said binder,
  molding said mass to the form desired by cold extrusion at room temperature, and
  bonding the aforesaid extruded mass into a unitary body by rapidly baking said mass at a temperature rate of from 100° C. per hour to 1000° C. per hour to remove the solvent and the pitch volatiles thereby forming an electrode consisting of the metal oxide and the non-volatile carbon resulting from the pitch distillation which bonds the metal oxide particles together.

2. A process for forming an electrically conductive carbon-containing body for use as an electrode which comprises the steps of
  mixing a powdered carbon with a powdered metal oxide
  preparing a quantity of binder having a 51–58% pitch content by weight and a 42–49% solvent content by weight which renders said binder fluid at room temperature said pitch containing in part undistilled volatiles and carbon,
  cold mixing 100 parts by weight of said carbon-metal oxide mixture with 12 to 42 parts by weight of said fluid binder until the carbon-metal oxide-binder mass is homogeneous and in an extrudable state where the grains of said carbon and metal oxide are coated with said binder,
  molding said mass to the form desired by cold extrusion at room temperature, and
  bonding the aforesaid extruded mass into a unitary body by rapidly baking said mass at a temperature rate of from 100° C. per hour to 1000° C. per hour to remove the solvent and the pitch volatiles thereby forming an electrode consisting of the powdered carbon, the powdered metal oxide, and the non-volatile carbon resulting from the pitch distillation which binds the powdered carbon and the metal oxide particles together.

3. A process for forming an electrically conductive carbon-containing body for use as an electrode which comprises the steps of
  mixing a powdered carbon with a powdered metal oxide
  preparing a quantity of binder having a 51–58% pitch content by weight and a 42–49% solvent content by weight which renders said pitch fluid at room temperature, said pitch containing in part undistilled volatiles and carbon,
  cold mixing 100 parts by weight of said carbon-metal oxide mixture with 12 to 42 parts by weight of said fluid binder until said carbon-metal oxide-binder mass is homogeneous and in an extrudable state where the grains of said carbon and metal oxide are coated with said binder,
  placing said mixture in an extrusion press,
  evacuating the air from the press,
  extruding the cold mixture at room temperature through a die into the shape desired, and
  bonding the aforesaid extruded mass into a unitary body by rapidly baking said mass at a temperature of from 900° C. to 1000° C. for at least 15 minutes to remove the solvent and the pitch volatiles thereby forming an electrode consisting of the powdered carbon, the powdered metal oxide, and the non-volatile carbon resulting from the pitch distillation which binds the powdered carbon and the metal oxide particles together.

4. A process for forming an electrically conductive carbon-containing body for use as an electrode which comprises the steps of
  preparing a quantity of binder having a 51–58% pitch content by weight and a 42–49% plasticizer content by weight which renders said pitch fluid at room temperature, said pitch containing in part undistilled volatiles and carbon,
  cold mixing 100 parts by weight of powdered metal with 12 to 42 parts by weight of said fluid binder at a room temperature until the powdered metal-binder mass is homogeneous and in an extrudable state where the grains of said powdered metal are coated with said binder,
  molding said mass to the form desired by cold extrusion at room temperature, and
  bonding the aforesaid extruded mass into a unitary body by rapidly baking said mass at a temperature rate of from 100° C. per hour to 1000° C. per hour to remove the solvent and pitch volatiles thereby forming an electrode consisting of the powdered metal and the non-volatile carbon resulting from the pitch distillation which binds the metal particles together.

5. A process for forming an electrically conductive carbon-containing body for use as an electrode which comprises the steps of
  mixing a powdered carbon with a powdered metal,
  preparing a quantity of binder having a 51–58% pitch content by weight and a 42–49% solvent content by weight which renders said binder fluid at room temperature, said pitch containing in part undistilled volatiles and carbon,
  cold mixing 100 parts by weight of said carbon-metal mixture with 12 to 42 parts by weight of said fluid binder until the carbon-metal binder mass is homogeneous and in an extrudable state where the grains of said carbon and metal are coated with said binder,
  molding said mass to the form desired by cold extrusion at room temperature, and
  bonding the aforesaid extruded mass into a unitary body by rapidly baking said mass at a temperature rate of from 100° C. per hour to 1000° C. per hour to remove the solvent and the pitch volatiles thereby forming an electrode consisting of the powdered carbon, the powdered metal, and the non-volatile carbon resulting from the pitch distillation which binds the powdered carbon and the metal particles together.

6. A process for forming an electrically conductive carbon-containing body for use as an electrode which comprises the steps of
  preparing a quantity of binder having 51–58% pitch content by weight and a 42–49% plasticizer content by weight which renders said pitch fluid at room temperature, said pitch containing in part undistilled volatiles and carbon, cold mixing 100 parts by weight of powdered carbide with 12 to 42 parts by weight of said fluid binder at a room temperature until the powdered carbide-binder mass is homogeneous and in an extrudable state where the grains of said powdered carbide are coated with said binder, molding said mass to the form desired by cold extrusion at room temperature, and bonding the aforesaid extruded mass into a unitary body by rapidly baking said mass at a temperature rate of from 100° C. per hour to 1000° C. per hour to remove the solvent and pitch volatiles thereby forming an electrode consisting of the powdered carbide and the non-volatile carbon resulting from the pitch distillation, which binds the carbide particles together.

7. A process for forming an electrically conductive carbon-containing body for use as an electrode which comprises the steps of mixing a powdered carbon with a powdered carbide preparing a quantity of binder having a 51–58% pitch content by weight and a 42–49% solvent content by weight which renders said binder fluid at room temperature, said pitch containing in part undistilled volatiles and carbon, cold mixing 100 parts by weight of said carbon-carbide mixture with 12 to 42 parts by weight of said fluid binder until the carbon-carbide binder mass is homogeneous and in an extrudable state where the grains of said carbon and carbide are coated with said binder, molding said mass to the form desired by cold extrusion at room temperature, and bonding the aforesaid extruded mass into a unitary body by rapidly baking said mass at a temperature rate of from 100° C. per hour to 1000° C. per hour to remove the solvent and the pitch volatiles thereby forming an electrode consisting of the powdered carbon, the powdered carbide, the non-volatile carbon resulting from the pitch distillation which binds the powdered carbon and the carbide particles together.

References Cited by the Examiner

UNITED STATES PATENTS

| 1,130,533 | 3/1915 | Pictet | 264—65 |
| 2,799,912 | 7/1957 | Greger. | |
| 2,960,726 | 11/1960 | Sheer | 264—105 XR |
| 3,001,238 | 9/1961 | Goddel. | |

FOREIGN PATENTS 485,235   7/1952   Canada.

ROBERT F. WHITE, *Primary Examiner.*

R. B. MOFFITT, *Assistant Examiner.*